United States Patent
Hu et al.

(10) Patent No.: US 10,957,032 B2
(45) Date of Patent: Mar. 23, 2021

(54) FLEXIBLE VISUAL INSPECTION MODEL COMPOSITION AND MODEL INSTANCE SCHEDULING

(71) Applicant: INTERNATIONAL BUSINESS MACHINES CORPORATION, Armonk, NY (US)

(72) Inventors: Guo Qiang Hu, Shanghai (CN); Jun Zhu, Shanghai (CN); Peng Ji, Nanjing (CN); Bo Wen Wei, Xi'an (CN); Zhe Yan, Beijing (CN); Lei He, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/185,348

(22) Filed: Nov. 9, 2018

(65) Prior Publication Data
US 2020/0151869 A1    May 14, 2020

(51) Int. Cl.
G06F 9/455 (2018.01)
G06F 9/48 (2006.01)
G06T 7/00 (2017.01)

(52) U.S. Cl.
CPC ........ *G06T 7/0008* (2013.01); *G06F 9/45558* (2013.01); *G06F 9/4881* (2013.01);
(Continued)

(58) Field of Classification Search
None
See application file for complete search history.

(56) References Cited

U.S. PATENT DOCUMENTS 5,544,256 A  *  8/1996  Brecher ................ G06T 7/0006
                                                          382/149
8,782,611 B1    7/2014  Kretzler et al.
(Continued)

FOREIGN PATENT DOCUMENTS

CN    106952257 A    7/2017
JP    2014126445 A    7/2014

OTHER PUBLICATIONS

Liu et al., "Hybrid CPU-GPU scheduling and execution of tree traversals," ICS '16: Proceedings of the 2016 International Conference on Supercomputing, Jun. 2016, Article No. 2, pp. 1-12 (Year: 2016).*

(Continued)

*Primary Examiner* — Soo Shin
(74) *Attorney, Agent, or Firm* — Tutunjian & Bitetto, P.C.; Joseph Petrokaitis

(57) ABSTRACT

Scheduling automated visual inspection tasks includes capturing an image of a component to be inspected. A visual inspection model is formed with a model engine as a composite model of utility modules and functional modules to perform visual inspection of the image of the component. An abstract processing workflow of the visual inspection model is derived with a scheduler including dependencies between the utility modules and the functional modules. Performance of each of the functional modules is profiled with the scheduler by testing performance with available hardware resources to produce a performance profile. Parallel instances of each of the functional modules in a branch of the abstract processing workflow are scheduled with the scheduler according to the dependencies and the performance profiles. An indication of defects in the component is produced by processing the visual inspection model according to the scheduled functional modules.

18 Claims, 5 Drawing Sheets

(52) U.S. Cl.
CPC .............. *G06F 2009/45591* (2013.01); *G06T 2207/20084* (2013.01)

(56) References Cited

U.S. PATENT DOCUMENTS

| | | | |
|---|---|---|---|
| 9,733,200 | B2 | 8/2017 | Sugimoto et al. |
| 10,346,969 | B1* | 7/2019 | Raghu ................ G01N 21/8803 |
| 2004/0236620 | A1* | 11/2004 | Chauhan ................ G06Q 10/06 705/7.14 |
| 2011/0022817 | A1 | 1/2011 | Gaster et al. |
| 2012/0027288 | A1 | 2/2012 | Yuan et al. |
| 2013/0002689 | A1 | 1/2013 | Panneer et al. |
| 2015/0057952 | A1 | 2/2015 | Coombs et al. |
| 2016/0027051 | A1* | 1/2016 | Gross .................... G06Q 50/16 705/14.54 |
| 2018/0144465 | A1* | 5/2018 | Hsieh ....................... G06N 3/08 |
| 2018/0284735 | A1* | 10/2018 | Cella ................... G06K 9/6263 |
| 2019/0096057 | A1* | 3/2019 | Allen .................... G06T 7/0004 |
| 2019/0096135 | A1* | 3/2019 | Dal Mutto ................ G06T 7/50 |
| 2019/0101905 | A1* | 4/2019 | Zhang ............. G05B 19/41845 |
| 2020/0160089 | A1* | 5/2020 | Jimenez Pelayo .... G06T 7/0004 |

OTHER PUBLICATIONS

Velez, "Adaptive Structured Parallelism," PhD Thesis, University of Edinburgh, 2008 (Year: 2008).*

Xie, "A Physics-Based Defects Model and Inspection Algorithm for Automatic Visual Inspection" Optics and Lasers in Engineering, ScienceDirect, vol. 52, Jan. 2014, pp. 218-223.

Liu, "Hybrid CPU-GPU Scheduling and Execution of Tree Traversals", Proceedings of 2016 International Conference on Supercomputing, Jun. 2016, 12 pages.

Zintgraf, "Visualizing Deep Neural Network Decisions: Prediction Difference Analysis", ICLR, Feb. 2017, 12 pages.

* cited by examiner

US 10,957,032 B2

FLEXIBLE VISUAL INSPECTION MODEL COMPOSITION AND MODEL INSTANCE SCHEDULING

BACKGROUND

Technical Field

The present invention generally relates to process scheduling, and more particularly to flexible visual inspection model composition and model instance scheduling for inspection tasks.

Description of the Related Art

Many industries can benefit from automated visual inspections. Due to high volume production and difficulties in manually finding defects, an automated visual inspection system stands to reduce time and costs associated with quality control in manufacturing, production and transport of products and goods, including, e.g., textile products, furniture, semiconductor fabrication, produce harvesting and shipping, and any other products benefiting from visual inspection.

However, automated visual inspection can include a variety of tasks for the inspection of each product. Each of these tasks may have different resource requirements that can lead to bottlenecks and inefficiencies when being processed.

SUMMARY

In accordance with an embodiment of the present invention, a method for scheduling automated visual inspection tasks is presented. The method includes capturing an image of a component to be inspected using an imaging device. A visual inspection model is formed with a model engine as a composite model of at least one utility module and at least one functional module to perform visual inspection of the image of the component. An abstract processing workflow of the visual inspection model is derived with a scheduler including dependencies between the at least one utility module and the at least one functional module. Performance of each of the at least one functional module is profiled with the scheduler by testing performance with available hardware resources to produce a performance profile for each of the at least one functional module. Parallel instances of each of the at least one functional modules in a branch of the abstract processing workflow is scheduled with the scheduler according to the dependencies and the performance profiles. An indication of defects in the component is produced by processing the visual inspection model according to the scheduled at least one functional module.

In accordance with another embodiment of the present invention, a method for scheduling automated visual inspection tasks is presented. The method includes capturing an image of a component to be inspected using an imaging device. A visual inspection model is formed with a model engine as a composite model of at least one utility module and at least one functional module to perform visual inspection of the image of the component. An abstract processing workflow of the visual inspection model is derived with a scheduler including dependencies between the at least one utility module and the at least one functional module. Performance of each of the at least one functional module is profiled with the scheduler by testing performance with available hardware resources to produce a performance profile for each of the at least one functional module. Parallel instances of each of the at least one functional modules in a branch of the abstract processing workflow is scheduled with the scheduler according to the dependencies and the performance profiles by comparing processing time of each of the at least one functional modules according to the corresponding performance profiles to reduce processing time without exceeding hardware resources according to a current utilization. A defect map of the component is displayed by processing the visual inspection model according to the scheduled at least one functional module.

In accordance with another embodiment of the present invention, a manufacturing automated visual inspection station is presented. The station includes an imaging device that captures an image of a component to be inspected. A model engine forms a visual inspection model as a composite model of at least one utility module and at least one functional module to perform visual inspection of the image of the component. A scheduler including at least one processor schedules parallel instances of each of the at least one functional modules in a branch of an abstract processing workflow according to dependencies and performance profiles. The scheduler includes an inspection model module that derives the abstract processing workflow of the visual inspection model including the dependencies between the at least one utility module and the at least one functional module and profiles performance of each of the at least one functional module by testing performance with available hardware resources to produce the performance profile for each of the at least one functional module. An alert device produces an indication of defects in the component by processing the visual inspection model according to the scheduled at least one functional module.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

According to an embodiment of the present invention, flexible visual inspection model composition and model instance scheduling are described.

Automated visual inspection in implementations, such as, e.g., production and shipping quality control, can include the use of multiple neural networks. In one embodiment, visual inspection includes at least two neural networks, an extraction network and a classifier network. The extractor extracts a region of interest from a product image, and the classifier detects whether the region of interest includes defects in the product. Each neural network can take up large amounts of storage and use large amounts of memory, such as, e.g., random access memory (RAM), as well as large processing times. The use of graphical processing units (GPUs) to implement the neural networks can use an especially large amount of resources. However, the use of the central processing unit (CPU) can result in slow processing.

Accordingly, an embodiment of the present invention includes modularizing a visual inspection model. The visual inspection model can include a module with the extractor and the classifier that can be parallelized to perform visual inspection in multiple parallel instances of the model. Each module can be utilized for, e.g., a separate region of interest in an image, or a separate image, or a combination. Each module or model instance can therefore be realized as an independent thread or process executed by a CPU and GPU. Thus, the visual inspection is instantiated at a module level rather than a model level. Accordingly, the visual inspection model can be flexibly processed according to available resources and to reduce the use of computing resources. As a result, automated visual inspection is made more efficient and faster.

Exemplary applications/uses to which the present invention can be applied include, but are not limited to: feature recognition in visual inspection systems for, e.g., product quality control implementations.

Figure 1:
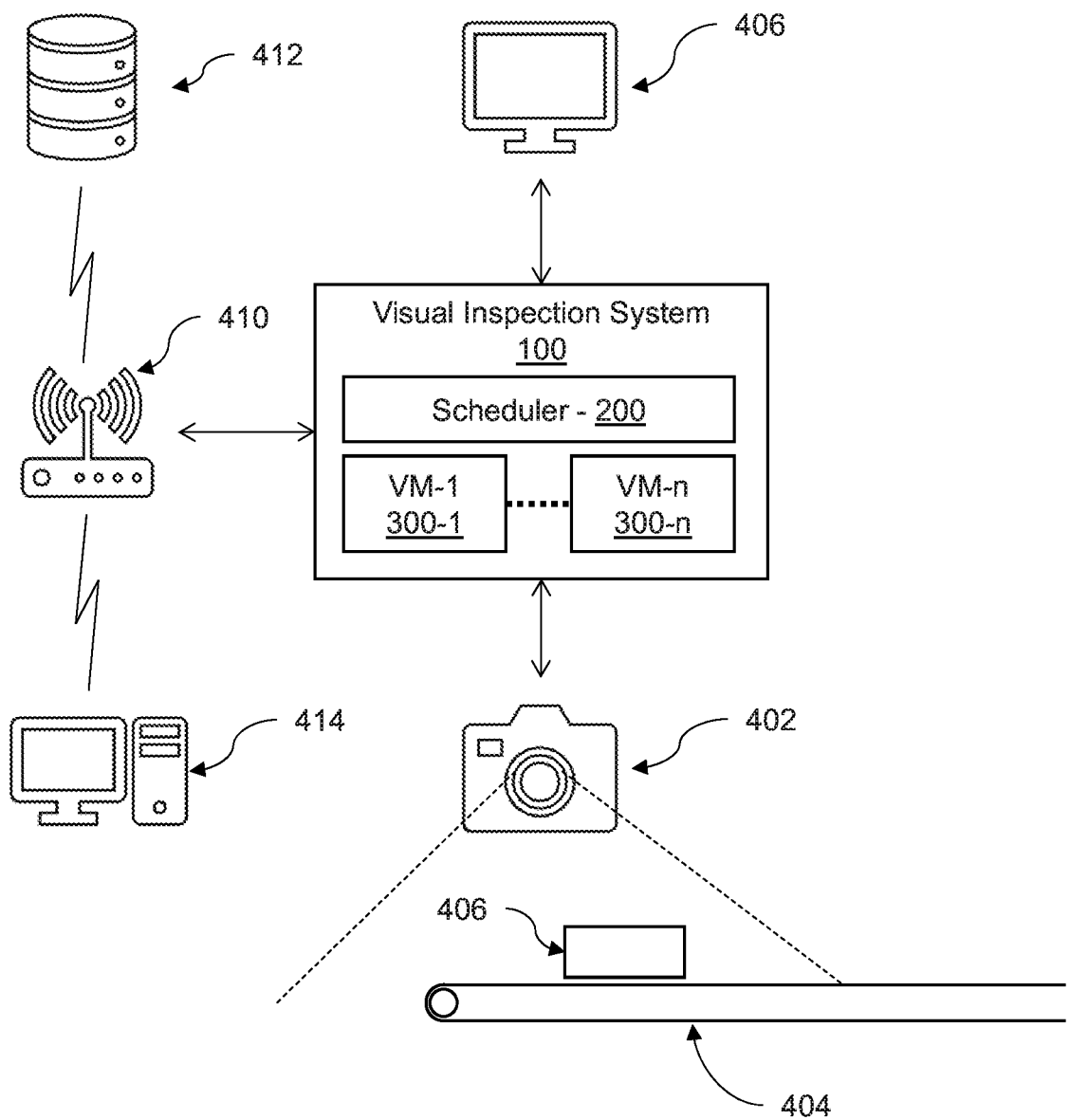
FIG. 1 is a diagram showing a system for visual inspection of products using flexible visual inspection model composition and model instance scheduling, in accordance with an embodiment of the present invention.

Referring now to the drawings in which like numerals represent the same or similar elements and initially to FIG. 1, a diagram showing a system for visual inspection of products using flexible visual inspection model composition and model instance scheduling is illustratively depicted according to an embodiment of the present invention.

According to an embodiment of the present invention, components 406, such as, e.g., parts, products, goods, produce, or other components to be inspected for quality, are inspected by a visual inspection system 100 as the components 406 travel through a production line 404. The production line 404 can include, e.g., a stage in production of the component 406, a shipment stage after production, or any other stage where visual inspection can occur. Thus, the visual inspection system 100 can control an imaging device 402, such as, e.g., a digital camera, to capture images of the component 406.

The visual inspection system 100 receives the component images from the imaging device 402 to perform visual inspection. The visual inspection system 100 can employ one or more models to analyze the images and detect defects in the components 406. To facilitate efficient defect detection, particularly in complex products, the visual inspection system 100 can use, e.g., a composite model that extracts sub-images from each image of a component 406. As a result, each sub-image can be analyzed by an independent processing flow.

To improve the efficiency of executing each processing flow, the visual inspection system 100 can include, e.g., multiple nodes such as multiple VMs 300-1 through 300-*n*, such as, e.g., by utilizing servers and/or cloud computing systems in the visual inspection system 100. Accordingly, the visual inspection system 100 can include one or more processing system, each processing system including, e.g., a central processing unit (CPU), a graphical processing unit (GPU), memory, storage, and other processing components.

To determine the optimum apportionment of processing flows corresponding to sub-images of the component 406, the visual inspection system 100 can schedule the VMs 300-1 through 300-*n* across the available processing system resources using a scheduler 200. The scheduler 200 can schedule instances of the model to run on VMs 300-1 through 300-*n*, with one or more model instances on each of the VMs 300-1 through 300-*n*. As such, the model instances can run in parallel as the VMs 300-1 through 300-*n* run concurrently.

However, rather than scheduling the model instances according to resources demanded by a model instance, the model instances can be scheduled according to modules within the model instance. Each model instance can include, e.g., multiple functional and utility modules, such as, e.g., classifiers and extractors, for performing particular tasks within a model instances to detect defects in a sub-image of the component 406. For example, the model instance can include a common utility module that initiates and implements functional modules. The functional modules can perform the extraction and classification tasks. In one possible embodiment, one functional module is used for extraction and a second functional module is used for classification of the extracted content. However, other functional modules can be used to performing different or additional functions.

The functional modules can perform multiple independent tasks. For example, an extractor can extract multiple regions of interest from an image with corresponding multiple extractions. Each extraction is independent from each other extraction. Thus, performing extraction in parallel can reduce processing time. Similarly, classification of an extracted region can be an independent process for each extracted region. Therefore, parallel classification tasks can also reduce processing time. Thus, the modules can be scheduled according to a degree of independence.

Moreover, each module within the model instance can impose different resource demands on a processing system. Accordingly, the scheduler 200 can schedule modules within the model to be performed in parallel. Thus, for example, CPU intensive tasks, which can take longer to perform, can be scheduled with increased parallelization relative to GPU intensive tasks, which can be performed relatively quickly. Thus, backlogs and bottlenecks can be reduced and the visual inspection system 100 can be made more efficient.

Once each module of the model is processed by the corresponding VMs 300-1 through 300-*n*, the visual inspection system 100 can output a defect indication. The defect indication can include, e.g., an anomaly map of the component 406, an audible or visual alert of a defect for a component 406, a text based alert including information of the defect, an image of the component 406 including the defect, or any other notification identifying a defect. The defect indication can be provided to a user via a display 406 by depicting the defect indication.

Additionally, the defect indication can be communicated via a transmitter 410 to remote devices by, e.g., wired or wireless transmission, such as, e.g., WiFi, ethernet, radio frequency (RF) communication, or other suitable communication protocol. The remote devices can include a database 412 for storing the defect indication and compiling a record of components 406 with defects. Analytics can be performed on the record at the database 412 to improve production lines. Additionally, the remote devices can include a remote computer 414 for notifying remotely located administrators or users. Any other suitable devices can also be included in communication with the visual inspection system 100 for administration, control, and observation of the operation of the visual inspection system 100.

Figure 2:
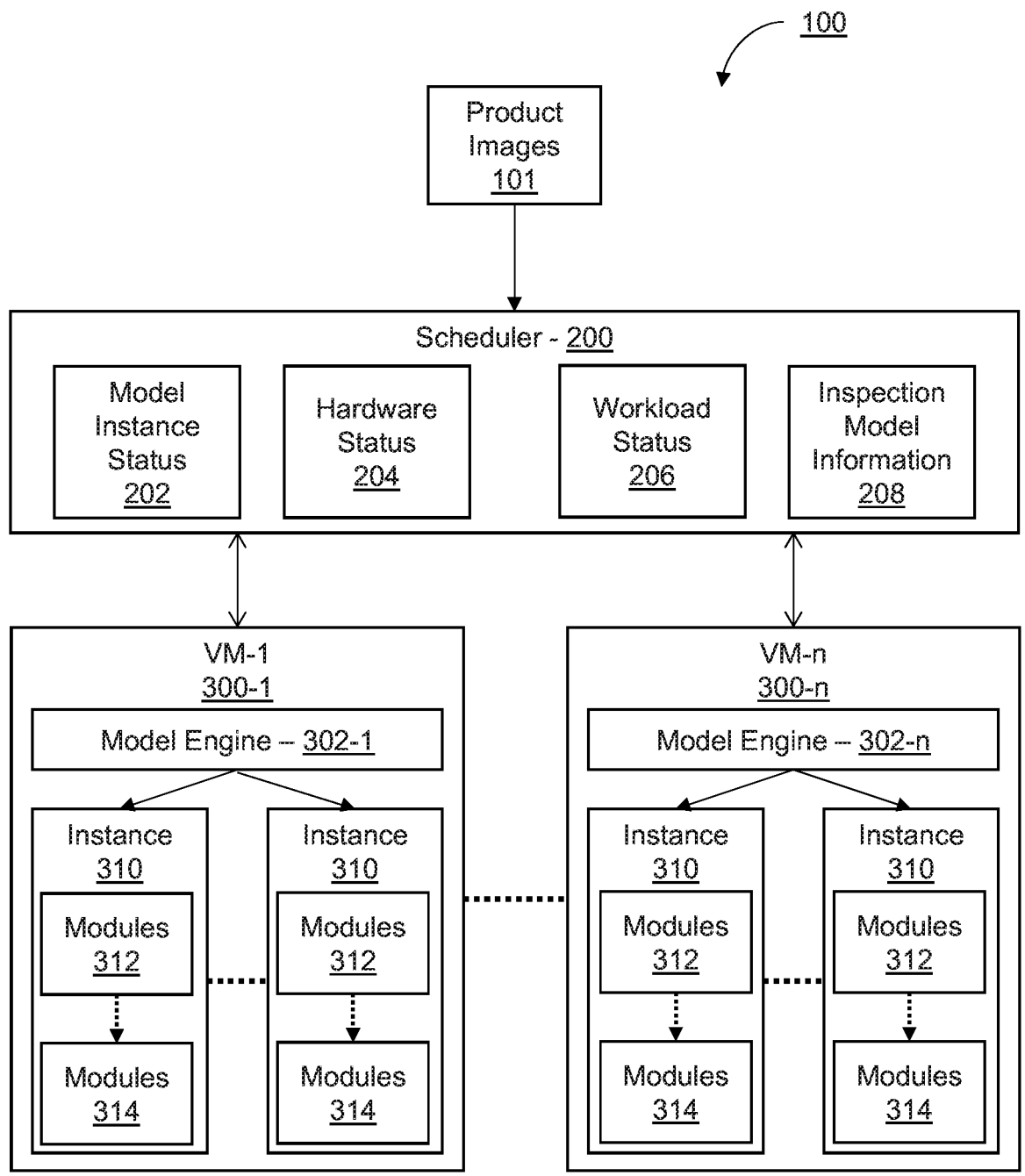
FIG. 2 is a diagram showing a scheduler controlling multiple virtual machines to schedule model instances, in accordance with an embodiment of the present invention.

Referring now to FIG. 2, a diagram showing a scheduler controlling multiple virtual machines to schedule model instances is illustratively depicted according to an embodiment of the present invention.

According to aspects of the present invention, the visual inspection system 100 can include product images 101 provided to a scheduler 200. The scheduler 200 can schedule models for defect recognition, such as, e.g., composite models with multiple modules, to utilize existing resources in, e.g., servers, a cloud computing environment, or other computing environment, such as by initializing VMs 300-1 through 300-n. The scheduler 200 maintains logs in, e.g., a memory or storage device, of pertinent status information, including model instance status 202, hardware status 204, workload status 206 and inspection model information 208.

To schedule the models of a composite model used to analyze the product images 101, the scheduler 200 apportions tasks to the VMs 300-1 through 300-n according to available resources, as recorded in the hardware status 204, workload status 206 and model instance status 202. Using this information, the scheduler 200 can determine the available physical resources for a VM to initialize a composite model.

Based on the available resources and the models corresponding to each of the product images 101, the scheduler 200 determines model resource requirements from the inspection model information 208. The inspection model information 208 can include, e.g., model composition, such as, e.g., a composition graph, a workflow graph, module profiling info, and any other information related to a composite model. For example, the model can be a utility model used to analyze one of the product images 101 including a composite model that includes multiple functional model modules such as, e.g., extractors and classifiers. The inspection model information 208 can include information related to resource requirements for each of the modules in each model of a composite model.

Using the resource requirements of the modules as well as the other inspection model information 208, the scheduler 200 can determine an optimal number of module instances. Rather than initializing a utility model according to model resource usage, a number of modules for a model can be determined that reduces the amount of time to process the model. Thus, the scheduler 200 can determine available physical resources from the hardware status 204. The scheduler 200 can then determine the resource usage from the workload status 206, as well as module backlogs and statuses from the model instance status 202. Then, using the inspection model information 208, the scheduler 200 can maximize use of the available resources by initializing modules of the model to run in parallel within one or more of the VMs 300-1 through 300-n.

The scheduler 200 can generate the composition graph and the workflow graph to produce abstract workflow graphs representing the processing of modules 312 and 314. According to the composition graph and the workflow graph of the inspection model information 208, the scheduler 200 can determine that some of the modules 312 and 214 in each of the model instances 310 can be processed in parallel. For example, a composite model can include functional modules including, e.g., first modules 312 and second modules 314, as well as additional modules. The second modules 314 can depend from the first modules 312. However, the first modules 312 and the second modules 314 can each include recurring operations or tasks that can be processed in parallel. Therefore, an instance 310 can include multiple of the first modules 312 in parallel with each other, and multiple of the second modules 314 in parallel with each other, but with the first modules 312 and the second modules 314 processed in series with respect to each other. The scheduler 200 determines a number of instances of each of the first modules 312 and the second modules 314 to increase efficiency and reduce bottlenecks in processing.

For example, one of the first or second modules 312 or 314 can utilize more system memory and CPU operations, while the other utilizes more graphical memory and GPU operations. GPU operations may demand more memory but be performed more quickly, while CPU operations use less memory but are performed more slowly. Thus, the module that uses more CPU operations may be initialized within the instance 310 more times than the module that used GPU operations such that each of the modules can be scheduled to reduce idle times of the CPU and GPU, thus reducing wasted time waiting for operations of one or the other module to complete. Thus, backlogs in modules 312 and 314 operations can be decreased and efficiency and time to completion can be improved.

Additionally, the scheduler 200 can also schedule multiple instances 310 to perform multiple parallel operations of an instance including first and second modules 312 and 314. Thus, a model can be further modularized to have multiple model instances 310 for each model initialized by a model engine 302-1 through 302-n. The scheduler 200 takes the available physical resources into account to determine an optimal number of model instances 310 for each model initialized by the model engines 302-1 through 302-n. Therefore, the scheduler 200 can apportion VM resources to model engines 302-1 through 302-n according to the model instances 310 and the modules 312 and 314 that most improve the efficiency of the visual inspection system 100.

As a result, the scheduler 200 dynamically determines a process flow for composite models, including an optimum number of model instances within each model as well as an optimum number of module instances within the model. As a result, tasks can be scheduled to physical resources according to finely tuned modularization of the composite model that most increases efficiency and reduces wait times. Thus, automated visual inspections can be performed more quickly and efficiently.

Referring now to FIG. 3, a diagram showing a composite model including extractors and classifiers for performing visual inspection of a product using flexible visual inspection model composition is illustratively depicted according to an embodiment of the present invention.

According to an embodiment of the present invention, a visual inspection system can include a composite model 400 to identify defects 401 in an image 101 of a component on a production line. The composite model 400 can be a utility model that includes models 410 corresponding to categories of components or portions of components. For example, for visual inspection of a semiconductor chip, a model engine, such as the model engine of FIG. 2 described above, can implement the composite model 400 by initializing a model 410 corresponding to the shell, a model 410 corresponding to electrodes, a model 410 corresponding to an antenna, as well as models for any other portion of the chip to be inspected, as model instances on, e.g., a server or virtual machine.

Each model 410 can include functional models as modules for performing tasks of the visual inspection. For example, each model 410 can include extractors 412 that extract a region of interest. For example, the extractors 410 can extract a sub-image corresponding to the portion of the component to be inspected. The extractors 410 can extract the sub-image using, e.g., template matching, or other suitable extraction technique.

The sub-images can then be provided to classifier 414 modules in each model 410. The classifiers 414 analyze the sub-image and determine the existence of a defect in the region of interest of the component being inspected. To perform the defect detection, the classifiers 414 can utilize neural network based semantic classification, using, e.g., a convolutional neural network such as, e.g., GoogleNet, or any other suitable classification model.

The extractors 412 and the classifiers 414 utilize different resources. For example, the extractors 412 can utilize CPU threads and system memory, but relatively low amounts of GPU resources and GPU memory. The classifiers 414, however, can utilize relatively large amounts of GPU resources and GPU memory, but relatively low amounts of CPU resources and system memory. Moreover, due to the resources used for each of the extractors 412 and classifiers 414, the different modules can be completed over different durations. For example, because the extractors 412 rely on CPU processing, the extractors 412 can take longer to complete execution than the classifiers, which benefit from increased thread counts of GPUs and thus increased parallelization.

Therefore, to compensate for different processing times, the extractors 412 and classifiers 414 can be scheduled to have different numbers of instances. For example, because the extractors 412 can rely on CPU resources, thus taking longer to complete each extraction task, the extraction tasks can be spread across an increased number of extractor 412 instances, for example, 20 instances. Thus, the extraction module can be split into many threads corresponding to instances of the extractor 412 instances. The classifiers 414 can similarly be split into multiple instances. However, the classifiers 414 utilize different resources, and therefore perform the classification tasks over different durations that the extractors 412. Therefore, the classifiers 414 can be split into a different number of instances than the number of instances of the extractors 412.

Therefore, the modules of the extractors 412 and the modules of the classifiers 414 can be scheduled with different numbers of instances. As a result, hardware resources can be most efficiently implemented according to a flexible model 410 structure on a module level. Rather than instantiating and scheduling the composite model 400 according to the models 410, the composite model 400 can scheduled on a module level according to the extractors 412 and the classifiers 414. Thus, more flexible and efficient scheduling can be performed.

Figure 3A:
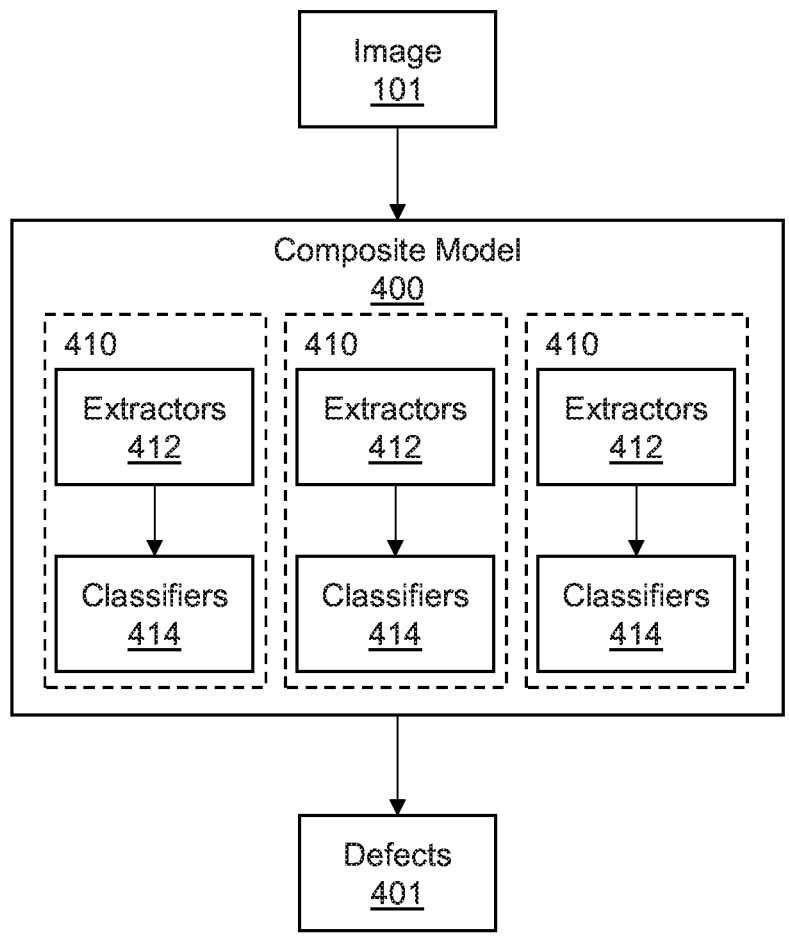
FIG. 3A is a diagram showing a composite model including extractors and classifiers for performing visual inspection of a product using flexible visual inspection model composition, in accordance with an embodiment of the present invention.
Figure 3B:
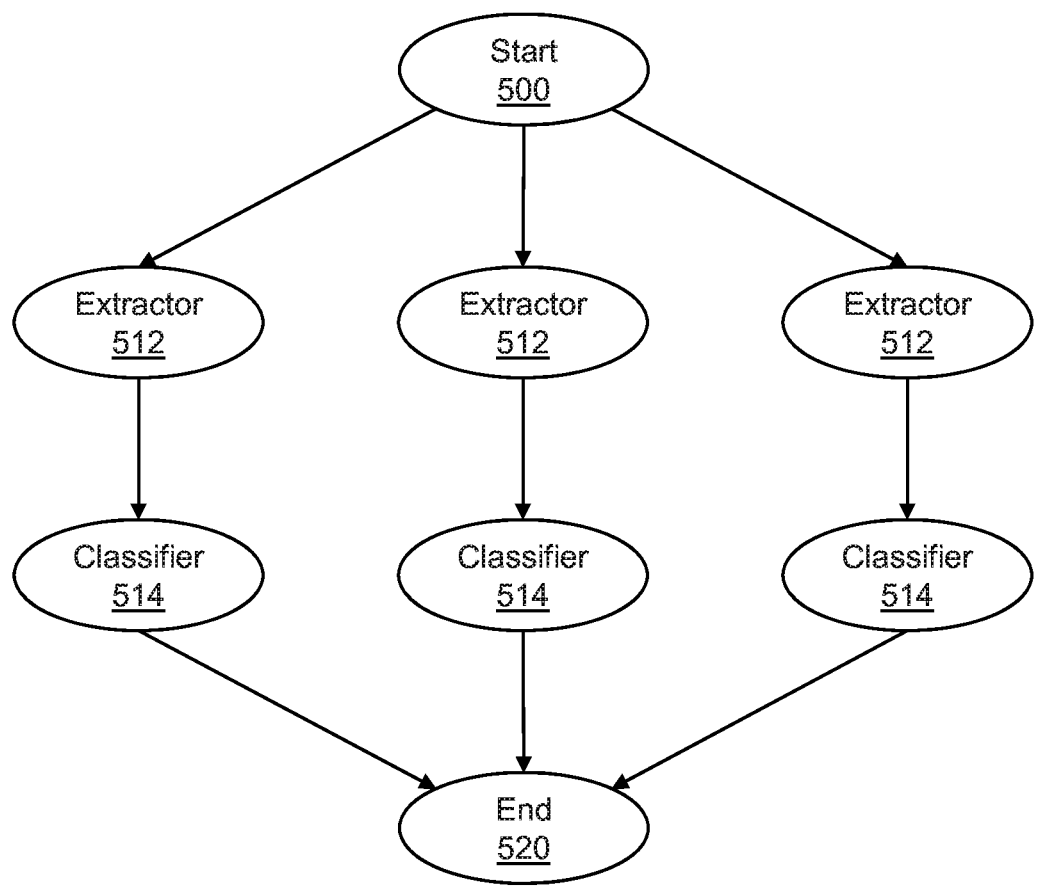
FIG. 3B is a diagram showing an abstract workflow graph corresponding to the composite model of FIG. 3A for profiling module instances to assist with scheduling, in accordance with an embodiment of the present invention.

Referring now to FIG. 3B, a diagram showing an abstract workflow graph corresponding to the composite model of FIG. 3A for profiling module instances to assist with scheduling is illustratively depicted according to an embodiment of the present invention.

According to aspects of the present invention, scheduling of modules 412 and 414 of the composite model 400 can be facilitated by the generation of an abstract process flow, such as, e.g., an workflow graph as described above with reference to the inspection model information 208 of FIG. 2 above. Each of the extractors 412 and the classifier 414 are functional modules of the model 410 of the composite model 400.

To form the workflow graph, dependence between the extractors 512 and classifiers 514 can be analyzed from start 500 to end 520. For example, there can be multiple independent extractors 512 initialized from start 500. However, each classifier 514 can depend from a corresponding extractor 512. Executing an extractor 512 thus leads to a classifier 514. Executing the classifier 514 can then lead to the end 520, returning, e.g., a defect map.

By determining the dependencies, modules can be profiled for resource requirements. Profiles can include an average processing time, a thread consumption, a system memory consumption, a GPU memory consumption, among other resource information. An extractor 512 can be assessed for resource requirements to produce an extractor profile. For example, an extractor 512 can be a template based region of interest extractor, as described above. Thus, the extractor profile can include an average processing time of, e.g., 5 ms, a thread consumption of, e.g., 1 thread, a system memory consumption of, e.g., 43 MB, and a GPU memory consumption of, e.g., 450 MB. The classifier 514, however, can include a profile with an average processing time of, e.g., 100 millisecond (ms), a thread consumption of, e.g., 1 thread, a system memory consumption of, e.g., 68 megabytes (MB), and a GPU memory consumption of, e.g., 0 MB.

Accordingly, the extractor 512 utilizes five times the processing time of the classifier 514. Therefore, it can be determined that scheduling can be optimized by increasing the number of instances of the extractor 512 to increase parallelization, thus decreasing time. In this example, the optimal number of instances of the extract 512 can be 20 instances, thus reducing the amount of time to perform extraction down to the amount of time to perform classification. However, to avoid competing for CPU resources with other composite models 400 and other models 410, the optimal number of extractor 512 instances can be determined as less than 20, such as, e.g., 5 or 10. Therefore, the inspection request load on each model is dynamic and flexible to achieve optimal resource usage on the module level, thus increasing efficiency and speed of operations.

Figure 4:
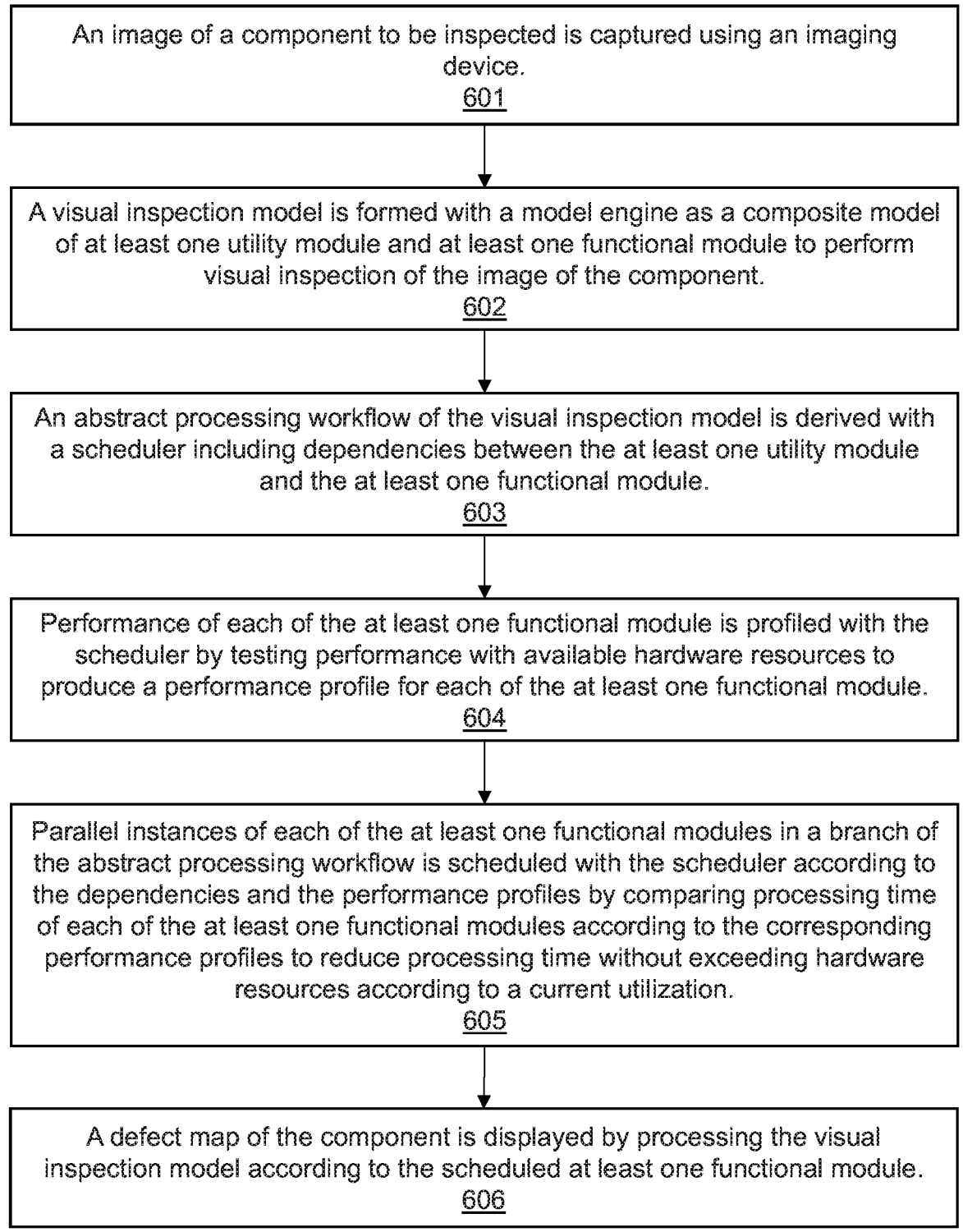
FIG. 4 is a block/flow diagram showing a system/method for flexible visual inspection model composition and model instance scheduling, in accordance with an embodiment of the present invention.

Referring now to FIG. 4, a block/flow diagram showing a system/method for flexible visual inspection model composition and model instance scheduling is illustratively depicted according to an embodiment of the present invention.

At block 601, an image of a component to be inspected is captured using an imaging device.

At block 602, a visual inspection model is formed with a model engine as a composite model of at least one utility module and at least one functional module to perform visual inspection of the image of the component.

At block 603, an abstract processing workflow of the visual inspection model is derived with a scheduler including dependencies between the at least one utility module and the at least one functional module.

At block 604, performance of each of the at least one functional module is profiled with the scheduler by testing performance with available hardware resources to produce a performance profile for each of the at least one functional module.

At block 605, parallel instances of each of the at least one functional modules in a branch of the abstract processing workflow is scheduled with the scheduler according to the dependencies and the performance profiles by comparing processing time of each of the at least one functional modules according to the corresponding performance profiles to reduce processing time without exceeding hardware resources according to a current utilization.

At block 606, a defect map of the component is displayed by processing the visual inspection model according to the scheduled at least one functional module.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method flexible visual inspection model composition and model instance scheduling (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for scheduling automated visual inspection tasks, the method comprising:
    forming a visual inspection model with a model engine as a composite model of at least one functional module to perform visual inspection of an image of a component to be inspected;
    deriving a processing workflow of the visual inspection model with a scheduler;
    profiling performance of each of the at least one functional module with the scheduler by testing performance with available hardware resources to produce a performance profile for each of the at least one functional module;
    scheduling parallel instances of each of the at least one functional module in a branch of the processing workflow with the scheduler according to the performance profiles by comparing processing time of each of the at least one functional modules according to the corresponding performance profiles to determine a number of instances of each of the at least one functional module; and
    producing an indication of defects in the component by processing the visual inspection model according to the scheduled at least one functional module.

2. The method as recited in claim 1, wherein the at least one functional module includes:
    extracting a sub-image from the image with an extraction module, the sub-image including a region of interest for visual inspection; and
    identifying defects in the sub-image with a classifier module.

3. The method as recited in claim 1, wherein scheduling further includes scheduling the model engine to run on a virtual machine.

4. The method as recited in claim 1, wherein scheduling further includes scheduling the visual inspection model according to a status in the group consisting of hardware status, workload status and model instance status.

5. The method as recited in claim 1, wherein scheduling further includes scheduling each of the at least one functional module of an instance of the visual inspection model with different numbers of instances according to corresponding performance profiles.

6. The method as recited in claim 1, wherein scheduling further includes scheduling an instance of the visual inspection model for each of a plurality of regions of interest on the component.

7. The method as recited in claim 1, wherein scheduling further includes scheduling a first portion of the at least one functional modules to central processing unit (CPU) resources and schedule a second portion of the at least one functional modules to graphical processing unit (GPU) resources.

8. The method as recited in claim 1, wherein scheduling further includes scheduling the at least one functional module to reduce processing time without exceeding hardware resources according to a current utilization.

9. A method for scheduling automated visual inspection tasks, the method comprising:
    capturing an image of a component to be inspected using an imaging device;
    forming a visual inspection model with a model engine as a composite model of at least one utility module and at least one functional module to perform visual inspection of the image of the component;
    deriving a processing workflow of the visual inspection model with a scheduler including dependencies between the at least one utility module and the at least one functional module;
    profiling performance of each of the at least one functional module with the scheduler by testing performance with available hardware resources to produce a performance profile for each of the at least one functional module;
    scheduling parallel instances of each of the at least one functional modules in a branch of the processing workflow with the scheduler according to the dependencies and the performance profiles by comparing processing time of each of the at least one functional modules according to the corresponding performance profiles to reduce processing time without exceeding hardware resources according to a current utilization; and
    displaying a defect map of the component by processing the visual inspection model according to the scheduled at least one functional module.

10. The method as recited in claim 9, wherein the at least one functional module includes:
    an extraction module for extracting a sub-image from the image, the sub-image including a region of interest for visual inspection; and
    a classifier module for identifying defects in the sub-image.

11. The method as recited in claim 9, wherein scheduling further includes scheduling the model engine to run on a virtual machine.

12. The method as recited in claim 9, wherein scheduling further includes scheduling the visual inspection model according to a status in the group consisting of hardware status, workload status and model instance status.

13. The method as recited in claim 9, wherein scheduling further includes scheduling each of the at least one functional module of an instance of the visual inspection model with different numbers of instances according to corresponding performance profiles.

14. The method as recited in claim 9, wherein scheduling further includes scheduling an instance of the visual inspection model for each of a plurality of regions of interest on the component.

15. The method as recited in claim 9, wherein scheduling further includes scheduling a first portion of the at least one functional modules to central processing unit (CPU) resources and schedule a second portion of the at least one functional modules to graphical processing unit (GPU) resources.

16. A manufacturing automated visual inspection station, the station comprising:
 a model engine that forms a visual inspection model as a composite model of at least one functional module to perform visual inspection of an image of a component to be inspected;
 a scheduler including at least one processor that schedules parallel instances of each of the at least one functional module in a branch of a processing workflow according to performance profiles, including a comparison of processing time of each of the at least one functional modules according to corresponding performance profiles to determine a number of instances of each of the at least one functional module, the scheduler including:
  an inspection model module that derives the abstract processing workflow of the visual inspection model, and that profiles performance of each of the at least one functional module by testing performance with available hardware resources to produce the performance profile for each of the at least one functional module; and
 an alert device that produces an indication of defects in the component by processing the visual inspection model according to the scheduled at least one functional module.

17. The system as recited in claim 16, further including central processing unit (CPU) resources for scheduling a first portion of the at least one functional modules and graphical processing unit (GPU) resources for scheduling a second portion of the at least one functional modules.

18. The system as recited in claim 16, wherein the scheduler schedules each of the at least one functional module of an instance of the visual inspection model with different numbers of instances according to corresponding performance profiles.

* * * * *